Patented Jan. 31, 1928.

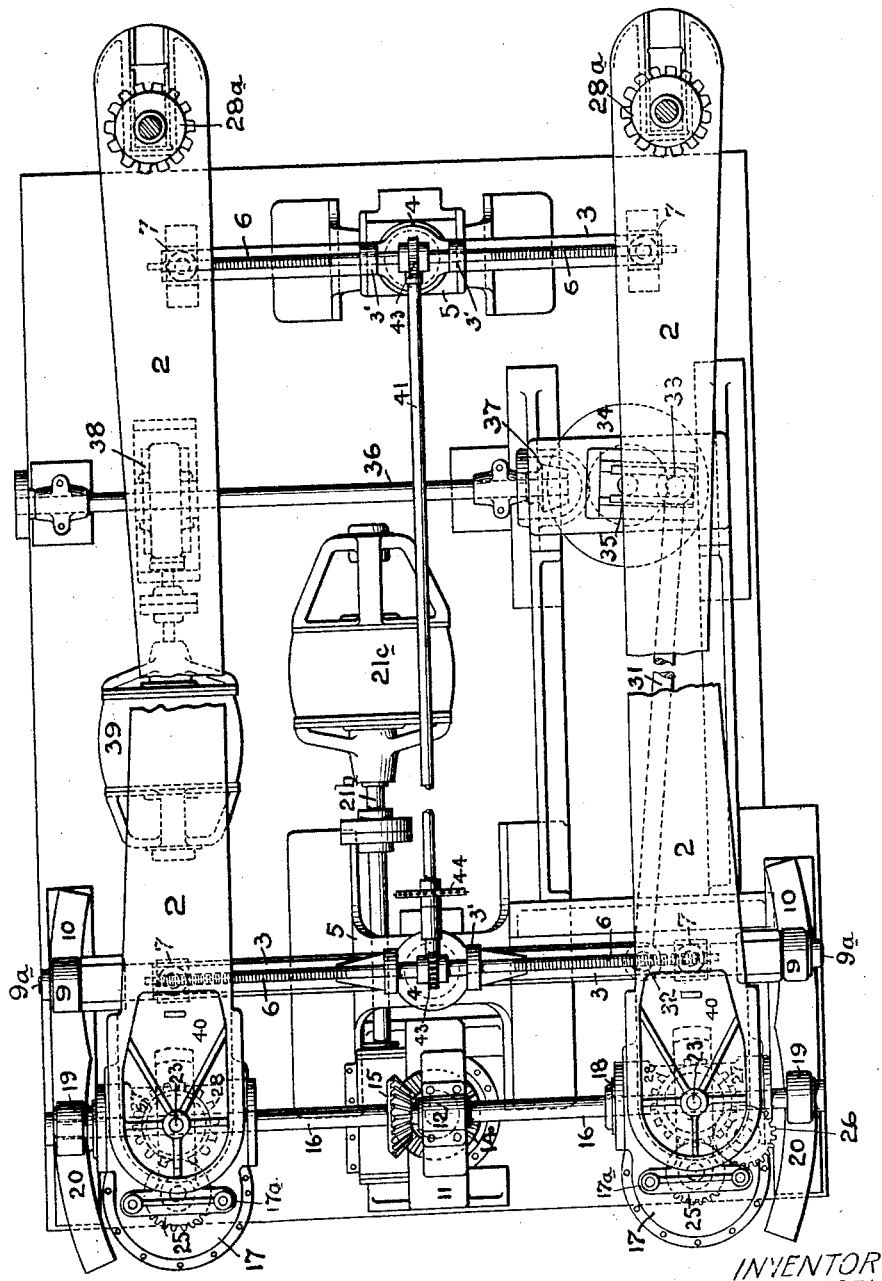

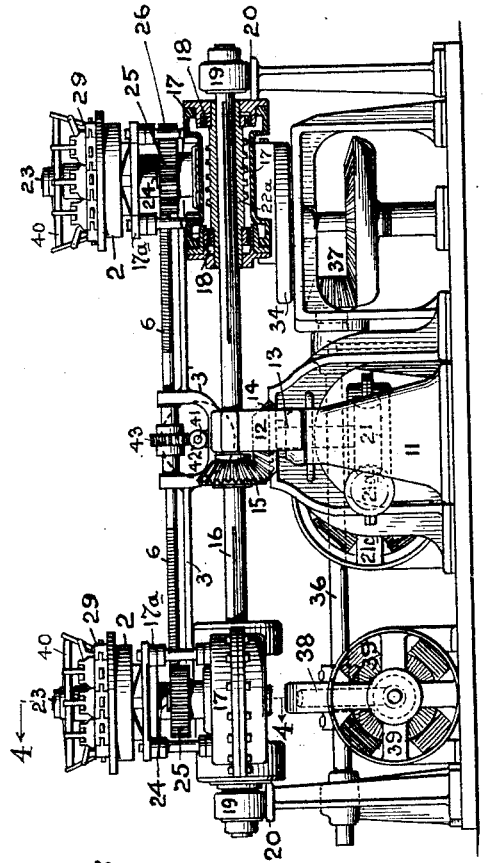

1,657,624

UNITED STATES PATENT OFFICE.

WALTER HENSEL, OF MERCHANTVILLE, NEW JERSEY, AND HARRY W. BUTTERWORTH, JR., OF PHILADELPHIA, PENNSYLVANIA, ASSIGNORS TO H. W. BUTTERWORTH & SONS COMPANY, A CORPORATION OF PENNSYLVANIA.

TENTERING MACHINE.

Application filed June 17, 1924. Serial No. 720,514.

Our invention relates to tentering machines and has for its object an improved power transmitting means for operating the chains of cloth clamps whereby both chains of cloth clamps are moved under precisely the same conditions in advancing through the machine, so that, during the reciprocation of the longitudinal frames upon which the cloth clamps are guided and between which the fabric is stretched and jigged, the fabric is subjected to uniform treatment during its passage longitudinally through the machine, said action being secured by causing the relative movements of the chains of clamps associated with each of the longitudinal reciprocating guide frames to perform the same action upon the respective selvages notwithstanding the opposite reciprocating actions which take place simultaneously with the forward travelling of the chains of clamps.

In machines of this class, the object is to impart a soft finish to fabrics such as white goods after bleaching, colored dyed goods and prints, and in which the degree of softness depends upon the extent of jigging imparted to the fabric during its passage through the tenter while being stretched and dried; and the capacity of the machine depends largely upon the maintenance of the extent of jigging required while permitting the fabric to be advanced through the machine as fast as possible. Further, our improvements are such as to insure proper operation of the chain carrying frames and the feeding of the chains that they may be simultaneously controlled in operation at any predetermined speeds required, they being operated by mechanism which permits varying the speed of travel of the chains independently of the speed of oscillation for the jigging operation, the mechanism for driving the chains embodying worm and worm-wheel silent drives, as more fully set out hereinafter.

More specifically, our invention embodies certain features of power transmitting gearing employing worm and worm-wheel drives and which cause the chain driving sprocket wheels to be driven with as little noise as possible.

Our invention also comprehends other features of improvement which, together with those above enumerated, are fully described hereinafter and more particularly pointed out in the claims.

Referring to the drawings: Fig. 1 is a plan view showing the two ends of a tenter embodying our invention, with the middle portions broken away; Fig. 2 is a side elevation of the same; Fig. 3 is a front view of the same; and Fig. 4 is a vertical section taken on line 4—4 of Fig. 3, and showing the details of the gearing employed in transmitting motion to the chain driving sprocket wheel.

2, 2, are the usual longitudinal reciprocating frames along which the chains of cloth clamps 29 are guided, the same being driven by sprocket wheels 28 at the receiving end and guided by sprocket wheels 28$^a$ at the delivery end. The cloth, on leaving the clamps, is guided about guiding means at 30 of any suitable construction. The longitudinal frames 2 are supported upon transverse pivoted frames 3 arranged at intervals along the length of the machine, the number of such frames being dependent upon the length of the machine, two being shown by way of example. These frames 3 are pivoted upon stationary pedestals 5 on vertical shafts 4 intermediate of the two longitudinal frames and said frames 3 are, moreover, provided with radial guides upon which blocks 7 are guided and by which the longitudinal frames 2 are supported by means of shoes 8 having vertical pivotal connections with the blocks 7. 6 are transverse adjusting screw rods which are journaled in the pivoted frames 3 and extend through the blocks 7 in such manner that by turning these screw threaded rods, the blocks are simultaneously moved toward or from each other for narrowing or widening the space between the longitudinal frames, as may be necessary to suit fabrics of different width. As shown, these screw threaded rods have right hand threads at one end and left hand threads at the other end, as is customary.

The forward pivoted frame 3 is provided with bearings 9$^a$ at each end having guide rollers 9 adapted to roll in contact with horizontal guide surfaces 10, the said frame 3 being rocked about its vertical axis 4 by means of a connecting rod 31 and crank wheel 34, which latter is provided with an adjustable crank pin 33 adjustable radially in guides 35 to adjust the throw or extent of oscillation which may be desired to be given to the frame 3 and thereby change the extent of reciprocation to be imparted to the longitudinal frames 2. This method of imparting reciprocation to the longitudinal frames is well known and will need no further description than to point out that the crank wheel 34 is rotated by means of bevel gears 37 and shaft 36, worm and worm-wheel gearing 38, and an electric motor 39.

16 is a transversely arranged worm shaft supported at its middle in a central bearing 12 and by rollers 19 at each end which travel over horizontal guide surfaces 20, the said shaft having near each end a worm 22ª provided with a splined connection so as to rotate with the said shaft while, at the same time, having capacity for adjustment longitudinally of said shaft to correspond to any adjustment of the longitudinal frames 2 toward or from each other. The worms 22ª are journaled in ball bearings at 18 within casings 17, said casings being respectively connected by frames 17ª to the under parts of the receiving ends of the longitudinal frames 2 by vertical pivot bearings 2ª concentric with the vertical driving shaft 23 for the sprocket wheel 28, so that the said frames 17 and 17ª move longitudinally with the reciprocating longitudinal frames 2 but at the same time, under the oscillation of the shaft 16, they rock about the vertical axis provided by the aforesaid vertical bearings 2ª and shaft 23 to the sprocket wheels. It will be understood that the oscillation of the worm shaft 16 about its middle bearing 12 is due to the fact that the longitudinal frames 2 are oscillated by the crank wheel 34, connecting rod 31 and forward oscillating frame 3, as before explained, and the oppositely reciprocating frames through their geared connection with the shaft 16 impart to said worm shaft 16 an oscillation which corresponds to and is in synchronism with the oscillations of the said forward pivoted frame 3.

22 are worm wheels journaled within the casings 17 and driven by the worms 22ª and permit a relatively high speed to the shaft 16 as compared to the shafts 24 to which the worm wheels 22 are secured. The shafts 24 extending from the worm wheels 22 connect with the chain driving sprocket wheels 28 and provide mechanical connection by spur gearing, whereby the motions or shafts 24 are transmitted to shafts 23. In view of the fact that the shafts 23 of the respective frames 2 are required to rotate in opposite directions, it becomes necessary, where the worm and worm-wheel gears are similar, to provide a direct gearing between the shafts 24 and 23 at one side of the machine and indirect gearing thereof at the other side of the machine. For example, it will be seen that in Fig. 4, which corresponds to the left-hand side of the machine (Fig. 3), the worm-wheel shaft 24 is provided with a spur gear 25 and this meshes directly with the spur gear 27 on the shaft 23. In the case of the geared connection at the right-hand side of the machine (Fig. 3), the gears 25 and 27 secured respectively to the shafts 24 and 23 are of a diameter in which they do not mesh but are connected by the employment of an intermediate gear 26, this being also clearly indicated in Figs. 1 and 2. In this manner, the vertical shafts 23 at each side of the machine will be rotated in opposite directions, so that the chains of clamps 29 at adjacent sides of the longitudinal frames 2 travel in the same direction.

The means for imparting rotation to the worm shaft 16 consists of the following instrumentalities: Shaft 16 is provided with a bevel gear 15 which meshes with a bevel gear 14 upon a vertical shaft 13, said shaft in alinement with the vertical axis of the middle bearing 12 of shaft 16. The lower end of vertical shaft 13 has a worm-wheel 21 which is driven by a worm 21ª on the end of a shaft 21ᵇ driven by an electric motor 21ᶜ. It is evident that the only function of this motor 21ᶜ is to operate the driving mechanism for the endless chains of clamps 29, said chains being driven at any speed desired to suit the character of the goods being treated, without reference to the rate of reciprocation of the longitudinal frames and their respective chains relatively to each other, since this latter motion is imparted by a separate electric motor 39 as a source of power. It is also to be understood that, assuming the speed of the chains to be predetermined, the extent of the reciprocation of the longitudinal frames may be varied by the adjustment of the crank wheel 34 and the number of reciprocations per given period of time may be varied by a variation in the speed of the motor 39.

As before pointed out, the longitudinal frames 2 and their chains of clamps are adjustable to or from each other by means of the right and left-hand screw threaded shafts 6. For convenience, these may be simultaneously driven by means common to them all which may be operated by hand or by a separate motor (not shown). In respect to this mechanism, each of the screw shafts 6 is provided with a worm-wheel 43, said worm-wheels being positioned immediately above the pivotal parts 4 of the oscillating frames 3. A longitudinal shaft 41 extends for approximately the length of the machine and is provided at intervals with worms 42 (Fig. 3) which respectively mesh with the worm-wheels 43. This shaft 41 may be rotated by hand for rotating the screw threaded shafts or provided with a sprocket wheel 44 which may be driven from any suitable motive power which may be put into operation when it is necessary to adjust the frames 2, 2, nearer or farther apart. The play between the teeth of the worm-wheels 43 and the spiral thread of the worms 42 is made sufficient to permit the oscillation of the frames 3 together with the screw threaded shafts and worm-wheels without binding upon or disengaging with reference to the worms 42.

By reason of the employment of the worm and worm-wheel driving mechanisms in connection with the chains of clamps, a high speed motor 21$^c$ may be employed and consequently may be of relatively small dimensions and economic in operation. Moreover, as great power may be thus provided through the worm and worm-wheel drive mechanism, the spur gears 25, 26 and 27 may be large and close fitting as may also be the bevel or miter gears 14 and 15, with the result that the back-lash tendency due to the oscillation of the worm shaft 16 and the power transmitting connections from the motor to the chains may be greatly eliminated and thereby secure a smooth silent power transmission from the motor to the chains.

While we have referred to the electric motor 21$^c$ as the source of power for driving the endless chains of clamps 29 through the various gearing including the worm and worm-wheel devices, it is to be understood that any other source of power may be employed in lieu of the electric motor, such as driving the shaft 21$^b$ by a belt wheel and belt and, therefore, we do not restrict ourselves to the use of an electric motor for this purpose.

It will now be apparent that we have devised a novel and useful construction which embodies the features of advantage enumerated as desirable, and while we have in the present instance shown and described the preferred embodiment thereof which has been found in practice to give satisfactory and reliable results, it is to be understood that we do not restrict ourselves to the details, as the same are susceptible of modification in various particulars without departing from the spirit or scope of the invention.

Having now described our invention, what we claim as new and desire to secure by Letters Patent is:

1. In a tentering machine, longitudinal reciprocating frames each provided with an endless chain of cloth clamps, and means to reciprocate said frames and simultaneously move them toward and from each other, in combination with power transmitting means from a source of power to the respective chains of clamps, comprising a sprocket wheel on each longitudinal frame for driving the chain of clamps thereon, a transverse oscillating shaft having worms at opposite sides of its pivot, said worms connected to rotate with the shaft but adjustable longitudinally thereon, worm-wheels meshing with the worms and respectively geared to the sprocket wheels to rotate them in opposite directions, frames supporting the worms and worm-wheels and connecting gearing for holding them in operative relation, said frames pivotally connected with the respective reciprocating frames on vertical axes coincident with the axes of the sprocket wheels, and power means for rotating the oscillating shaft.

2. The invention according to claim 1, wherein further, the power means for rotating the oscillating shaft consists of a vertical shaft mechanically connected with the oscillating shaft for rotating it, a worm and worm-wheel drive for said vertical shaft, and a power driven shaft for rotating the worm of the last mentioned worm and worm-wheel drive.

3. The invention according to claim 1, wherein further, the power means consists of a vertical shaft, gearing between the vertical shaft and the oscillating shaft, a worm-wheel on the vertical shaft below the oscillating shaft, a worm for operating the last mentioned worm-wheel, and an electric motor for operating the worm.

4. The invention according to claim 1, wherein the gearing between the sprocket wheels and worm-wheels includes a vertical shaft extending downward and journaled in the supporting frames and each provided with a spur gear on its lower part, a vertical shaft for each of the worm-wheels parallel to the shafts of the sprocket wheels, and each provided with a spur gear arranged in horizontal alinement with the spur gears on the sprocket wheel shafts, said spur gears of the respective sprocket wheel shaft and worm-wheel shaft in association with each longitudinal reciprocating frame mechanically connected for transmitting power but in which the mechanical connections are such that the sprocket wheel and shaft of the respective longitudinal frames are rotated in opposite directions.

5. The invention according to claim 1, wherein further, the frames for supporting the worm and worm-wheels constitute closures over the worm and worm-wheels are journaled therein, and are movable with the said frames in conformity with the adjustments of the longitudinally reciprocating frames and their oscillation in respect to said longitudinal frames.

6. The invention according to claim 1, wherein further, the supporting frames and connecting gearing consists of vertical shafts for the sprocket wheels in vertical alinement with the axis of the oscillating shaft, vertical shafts for the worm-wheels, connecting gearing between the vertical shafts, enclosing frames in which the worms and worm-wheels are enclosed, upper frames journaled to the respective longitudinal reciprocating frames concentrically with the vertical shafts of the sprocket wheels, and rigid connections for securing the upper frames respectively to the enclosing frames of the worms and worm-wheels.

7. In a tentering machine, longitudinal reciprocating frames each provided with an endless chain of cloth clamps, and means to reciprocate said frames and simultaneously move them toward and from each other, in combination with power transmitting means from a source of power to the respective chains of clamps, comprising a power driven shaft, an oscillating pivoted shaft, power transmitting conections between the power driven shaft and the oscillating shaft adjacent to its pivotal point, a sprocket wheel on each longitudinal frame for driving the chain of clamps thereon, power transmitting connections between the end portions of the oscillating shaft and the respective sprocket wheels and including worms on the oscillating shaft meshing with worm-wheels intermediate of said worms and the sprocket wheels, and supporting frames respectively between the worms and worm-wheels at each end of the oscillatig shaft and the corresponding longitudinal frames and journaled upon the same.

8. In a tentering machine, longitudinal reciprocating frames each provided with an endless chain of cloth clamps, and means to reciprocate said frames and simultaneously move them toward and from each other, in combination with power transmitting means from a source of power to the respective chains of clamps, comprising a sprocket wheel on each longitudinal frame for driving the chain of clamps thereon, a transverse oscillating pivoted shaft, means for rotating the oscillating shaft, power transmitting connections between the end portions of the oscillating shaft and the respective sprocket wheels and including worms on the oscillating shaft with provision for longitudinal adjustment thereon, and worm wheels intermediate of said worms and the sprocket wheels, and supporting frames respectively between the worms and worm-wheels at each end of the oscillating shaft and the corresponding longitudinal frames and journaled upon the same.

In testimony of which invention, we hereunto set our hands.

WALTER HENSEL.
HARRY W. BUTTERWORTH, Jr.